(12) United States Patent
Zhou et al.

(10) Patent No.: US 11,356,993 B2
(45) Date of Patent: Jun. 7, 2022

(54) RECONFIGURATION SIGNALING OF SEMI-PERSISTENT SCHEDULING

(71) Applicant: QUALCOMM Incorporated, San Diego, CA (US)

(72) Inventors: Yan Zhou, San Diego, CA (US); Xiaoxia Zhang, San Diego, CA (US); Sony Akkarakaran, Poway, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 32 days.

(21) Appl. No.: 16/865,048

(22) Filed: May 1, 2020

(65) Prior Publication Data

US 2020/0351843 A1    Nov. 5, 2020

Related U.S. Application Data

(60) Provisional application No. 62/843,272, filed on May 3, 2019.

(51) Int. Cl.
*H04W 72/04* (2009.01)
(52) U.S. Cl.
CPC ................... *H04W 72/042* (2013.01)
(58) Field of Classification Search
CPC .................................................. H04W 72/042
See application file for complete search history.

(56) References Cited

U.S. PATENT DOCUMENTS

| 10,009,909 | B2 | 6/2018 | Wang et al. | |
|---|---|---|---|---|
| 2012/0009923 | A1* | 1/2012 | Chen | H04L 5/0091 |
| 2017/0245165 | A1* | 8/2017 | Onggosanusi | H04L 5/0094 |
| 2018/0352541 | A1 | 12/2018 | Le | |
| 2019/0029006 | A1* | 1/2019 | Wang | H04W 72/1289 |
| 2019/0174327 | A1 | 6/2019 | You et al. | |
| 2019/0363843 | A1* | 11/2019 | Gordaychik | H04L 1/18 |
| 2021/0084639 | A1* | 3/2021 | Hoglund | H04W 72/04 |
| 2022/0046640 | A1* | 2/2022 | Tang | H04W 4/40 |

FOREIGN PATENT DOCUMENTS

WO     2018030766 A1    2/2018

OTHER PUBLICATIONS

Ericsson: "DL SPS", 3GPP Draft, 3GPP TSG RAN WG1 Meeting #92, R1-1802915, DL SPS, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 17, 2018 (Feb. 17, 2018), XP051398304, 2 pages, Retrieved from the Internet: URL: http://www.3gpp.org/ftp/tsg%5Fran/WG1%5FRL1/TSGR1%5F92/Docs/. [retrieved on Feb. 17, 2018] Section 2 Discussion; p. 1.
International Search Report and Written Opinion—PCT/US2020/031209—ISA/EPO—dated Aug. 26, 2020.

* cited by examiner

*Primary Examiner* — Ronald B Abelson
(74) *Attorney, Agent, or Firm* — Arent Fox, LLP

(57) ABSTRACT

Determining, at a base station, to modify at least one parameter associated with semi-persistent scheduling (SPS) of traffic for one or more user equipments (UEs). Generating a reconfiguration control message to transmit to the one or more UEs to signal the modification of the at least one parameter. The reconfiguration control message is one of a reconfigured downlink control information (DCI) that modifies an activation DCI or a redesigned format for DCI or MAC-CE. Transmitting the reconfiguration control message to the one or more UEs.

13 Claims, 10 Drawing Sheets

RECONFIGURATION SIGNALING OF SEMI-PERSISTENT SCHEDULING

CROSS-REFERENCE TO RELATED APPLICATIONS

The current application claims the benefit of U.S. Provisional Application No. 62/843,272, filed on May 3, 2019, entitled "Reconfiguration Signaling of Semi-Persistent RX/TX," the contents of which are incorporated by reference in its entirety.

BACKGROUND

Technical Field

The present disclosure relates generally to communication systems, and more particularly, to reconfiguration signaling of semi-persistent scheduling (SPS) in wireless communication systems.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communication (mMTC), and ultra-reliable low-latency communication (URLLC). Some aspects of 5G NR may be based on the 4G Long Term Evolution (LTE) standard. However, there still exists a need for further improvements in 5G NR technology. These improvements may also be applicable to other multi-access technologies and the telecommunication standards that employ these technologies.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

In an aspect, the disclosure provides a method of wireless communication for a user equipment. The method may include determining, at a base station, to modify at least one parameter associated with semi-persistent scheduling (SPS) of traffic for one or more user equipments (UEs); generating a reconfiguration control message to transmit to the one or more UEs to signal the modification of the at least one parameter, wherein the reconfiguration control message is one of a reconfigured downlink control information (DCI) that modifies activation DCI or a redesigned DCI or MAC-CE format; and transmitting the reconfiguration control message to the one or more UEs.

In another aspect, the disclosure provides an example apparatus for wireless communication. The apparatus may include a memory storing computer-executable instructions and at least one processor coupled with the memory. The at least one processor may be configured to determine, at a base station, to modify at least one parameter associated with SPS of traffic for one or more UEs; generate a reconfiguration control message to transmit to the one or more UEs to signal the modification of the at least one parameter, wherein the reconfiguration control message is one of a reconfigured DCI that modifies activation DCI or a redesigned DCI or MAC-CE format; and transmit the reconfiguration control message to the one or more UEs.

In another aspect, the disclosure provides an example apparatus for wireless communication. The example apparatus may include means for determining, at a base station, to modify at least one parameter associated with SPS of traffic for one or more UEs; generating a reconfiguration control message to transmit to the one or more UEs to signal the modification of the at least one parameter, wherein the reconfiguration control message is one of a reconfigured DCI that modifies activation DCI or a redesigned DCI or MAC-CE format; and transmitting the reconfiguration control message to the one or more UEs.

In another aspect, the disclosure provides a non-transitory computer-readable medium storing computer executable code. The code when executed by a processor may cause the processor to determining, at a base station, to modify at least one parameter associated with SPS of traffic for one or more UEs; generating a reconfiguration control message to transmit to the one or more UEs to signal the modification of the at least one parameter, wherein the reconfiguration control message is one of a reconfigured DCI that modifies activation DCI or a redesigned DCI or MAC-CE format; and transmitting the reconfiguration control message to the one or more UEs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
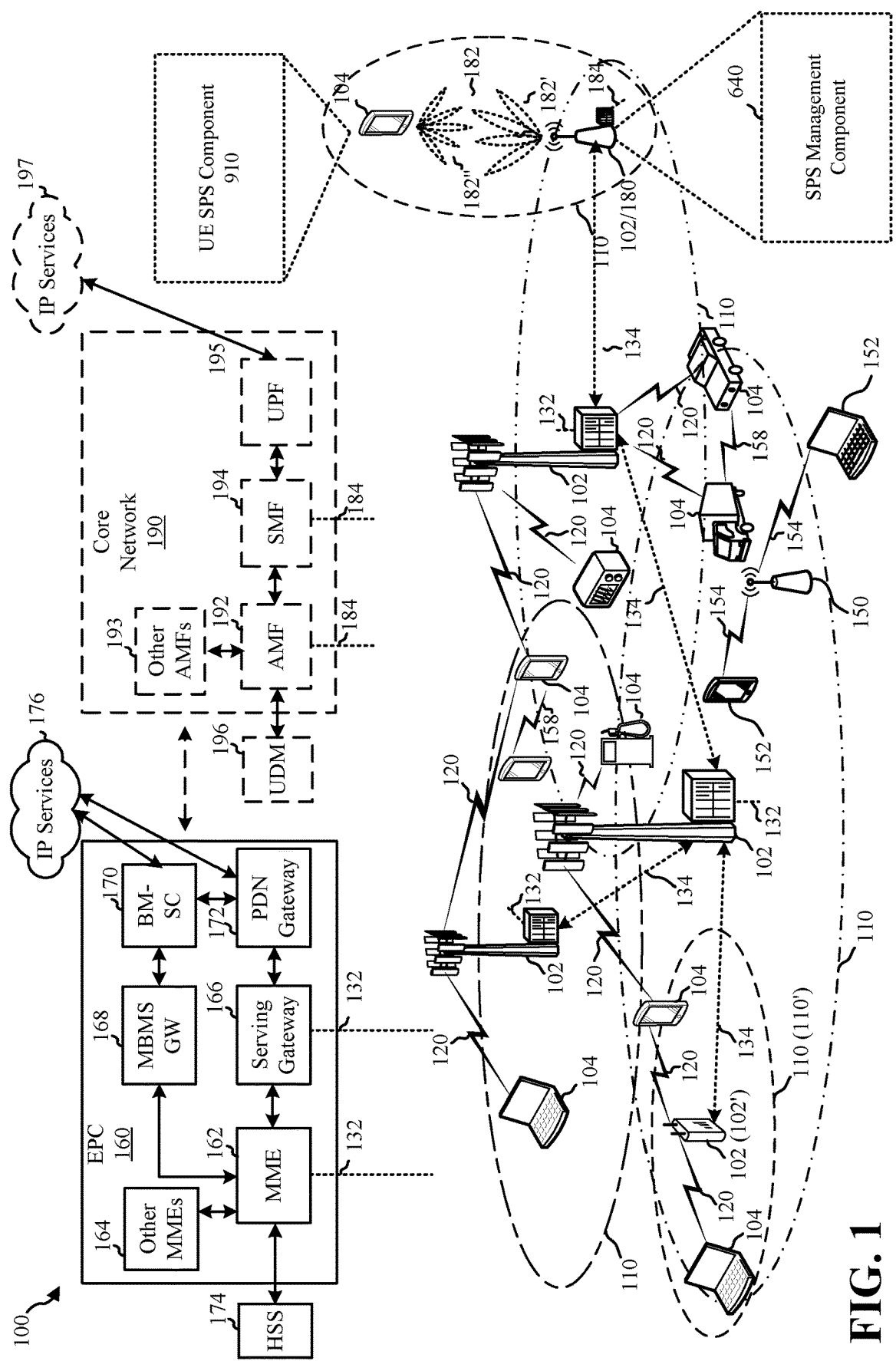
FIG. 1 is a diagram illustrating an example of a wireless communication system in accordance with aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form to avoid obscuring such concepts.

A semi-persistent scheduling (SPS) may provide for the scheduling of a periodic communication (e.g., an uplink communication or a downlink communication) for a user equipment (UE). Specifically, in wireless communication, the base station may schedule UEs using various scheduling mechanisms. As discussed above, one such mechanism is referred to as SPS. When a base station schedules a UE with SPS, the base station may allocate resources at once and let the UE use these resources instead of allocating the resources more periodically. In other words, the base station may assign a predefined amount of resources to a UE with a certain periodicity. Therefore, the UE is not required to request resources during each transmission time interval (TTI), thus saving control plan overhead at the base station. Thus, a base station may provide initial configuration information identifying an SPS configuration, and the UE may transmit or receive a communication in accordance with the SPS configuration. When scheduled semi-persistently, the UE may need to monitor a physical downlink control channel in every subframe since the base station may activate/re-activate/release SPS at any time using downlink control information DCI ("Activation DCI").

In some aspects, a UE may receive control information that overrides an SPS configuration. For example, if a physical downlink control channel (PDCCH) schedules a physical downlink shared channel (PDSCH) that at least partially overlaps with an SPS PDSCH, the beam of the SPS PDSCH may be overwritten by the beam used or indicated by the overriding PDCCH. This may be useful, for example, when the scheduling entity determines that an updated beam configuration may provide improved performance for reception of the SPS PDSCH. However, signaling the overriding PDCCH configuration for each occasion of an SPS PDSCH may cause significant signaling overhead, reducing efficiency of resource allocation.

A UE may also receive information from the base station reconfiguring an SPS PDSCH transmission configuration indication (TCI) states. For example, this information may include a media access control (MAC) control element (CE), downlink control information (DCI), and/or the like. The information may indicate an updated TCI state for an SPS communication. However, in some instances, the UE may not be capable of immediately implementing the updated TCI state (e.g., due to antenna limitations, radio frequency chain limitations, and/or the like). If a TCI state is indicated without enough time to implement the TCI state, reception performance of the corresponding PDSCH may suffer.

Some techniques and apparatuses described herein provide dynamic reconfiguration of virtual search spaces. For example, a virtual search space, and the corresponding virtual control resource set CORESETs (e.g., including the respective QCL parameters of the virtual CORESETs) may be indicated using lower-layer signaling than radio resource control (RRC), such as DCI or a MAC-CE. Thus, latency associated with the reconfiguration of virtual search spaces and/or CORESETs may be reduced by using lower layer signaling, thereby enabling improved performance of the UE with regard to an SPS communication. In some aspects, the above operations may be applied for a non-persistent communication (e.g., a dynamically scheduled communication, a one-off communication, and/or the like).

By reconfiguring the DCI or MAC-CE, any parameter associated with SPS communication (e.g., downlink or uplink) may be reconfigured, including but not limited to beam indication, modulation and coding schemes (MCS), rank, precoding matrix index, allocated time/frequency resource, period, offset, etc.). Aspects of the present disclosure provide two techniques to modify the format of the reconfigured DCI/MAC-CE. In the first example, aspects of the present disclosure may reuse existing SPS Activation DCI format with minor modifications to signal to the UE that the base station has reconfigured one or more configuration parameters. In a second example, aspects of the present disclosure introduce a new DCI/MAC-CE format for SPS reconfiguration with either fixed or dynamic definitions for one or more fields, where each field may carry one reconfigured parameter value. Additionally, reconfigured parameters for SPS/CG can also include resource repetition and location offset in each period.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communication system and an access network 100. The wireless communication system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunication System (UMTS) Terrestrial Radio Access Network (E-UTRAN)) may interface with the EPC 160 through backhaul links 132 (e.g., S1 interface). The backhaul links 132 may be wired or wireless. The base stations 102 configured for 5G NR (collectively referred to as Next Generation RAN (NG-RAN)) may interface with core network 190 and/or EPC 160 through backhaul links 132, 134, 184, which may be wired or wireless. In an aspect, for example, an EN-DC configuration may utilize an LTE master cell group (MCG) and EPC 160 to support communication between the UE 104 and base stations 102 configured for 5G NR. The base stations 102 configured for 5G NR may establish a backhaul link (e.g., S1 bearer) directly with the serving gateway 166 of the EPC or via a master eNB (i.e., a base station 102 configured for 4G LTE). Accordingly, a UE 104 may establish a 5G NR connection with a 5G access network even if a 5GC is not deployed. Although the following description may be focused on 5G NR and LTE, the concepts described herein may be applicable to other similar areas, such as, LTE-A, CDMA, GSM, and other wireless technologies.

In some examples, the base station 102 may include an SPS management component 640 for scheduling one or more UEs for SPS such that the eNB may allocate resources at once and let the UE use the allocated resources for downlink and uplink communication instead of allocating resources more periodically. In some examples, the SPS management component 640 may also be implemented for reconfiguring the DCI/MAC-CE format in accordance with aspects of the present disclosure discussed herein. Additionally, the UE 104 may receive DCI/MAC-CE message from the base station 102 and determine whether the received message is an activation DCI or a reconfiguration DCI, and configure the UE for SPS communication accordingly based on the determining. In some examples, the UE 104 may include a UE SPS component 910 for receiving a command to activate SPS on the UE; operating the UE under the current SPS in the absence of a new activation, re-activation; second receiving a command to modify, without releasing, the operating SPS; adjusting the UE configuration in response to the received command to modify; and second operating the UE under the adjusted configuration. The UE SPS component 910 is described in additional detail below.

In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communication systems, such as for example, FlashLinQ, WiMedia, Bluetooth, ZigBee, Wi-Fi based on the IEEE 802.11 standard, LTE, or NR.

The wireless communication system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communication using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting MBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. The AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology.

Figure 2:
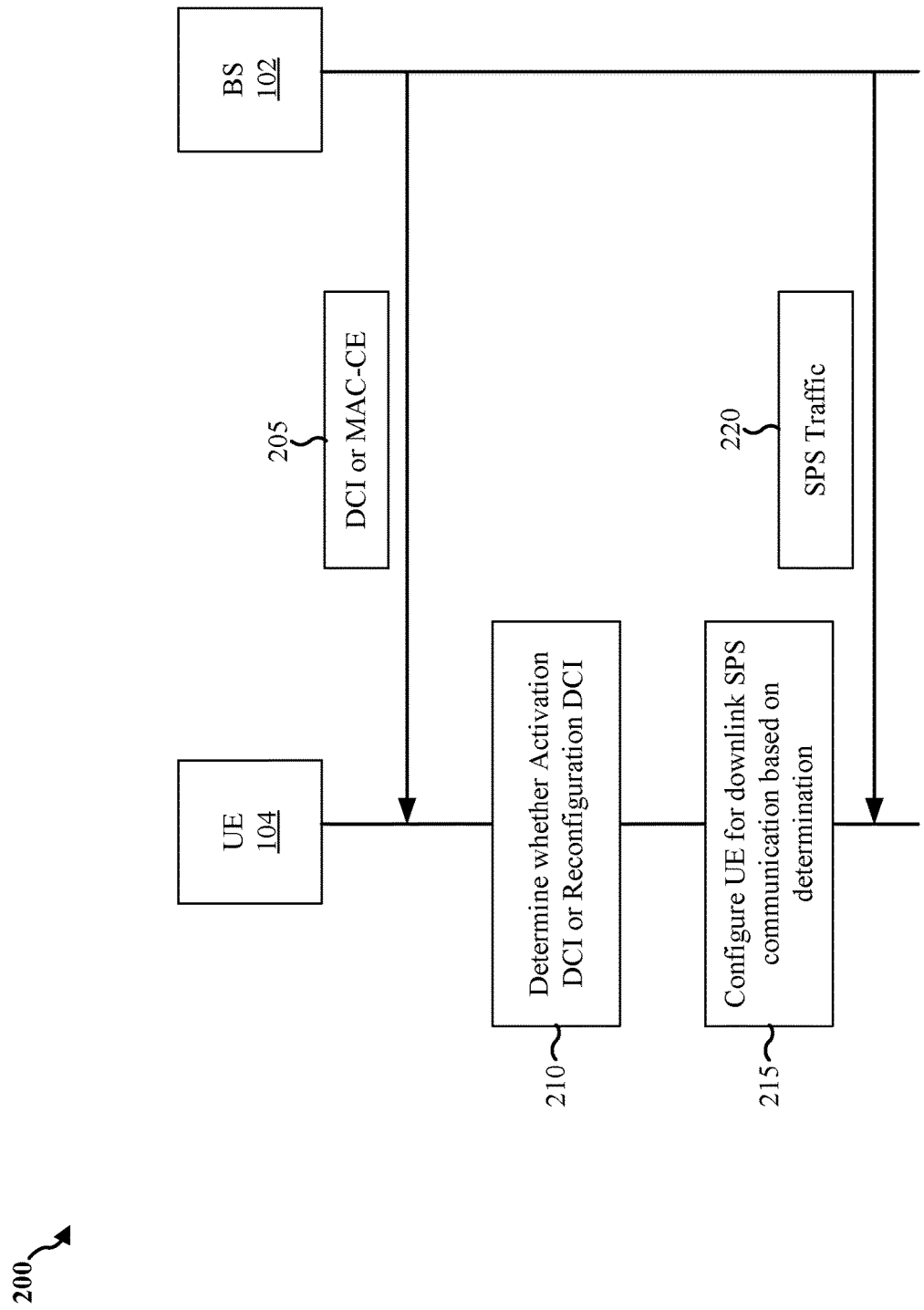
FIG. 2 is an example flowchart of reconfiguration of one or more parameters associated with SPS based on the reconfigured DCI/MAC-CE in accordance with various aspects of the present disclosure.

FIG. 2 is an example flowchart 200 of reconfiguration of one or more parameters associated with SPS based on the reconfigured DCI/MAC-CE in accordance with various aspects of the present disclosure.

At block 205, the base station 102 may transmit configuration information identifying a virtual CORESET or a virtual search space. For example, the base station 102 may transmit this information using DCI, a MAC-CE, and/or the like. The configuration information may include any information identifying or modifying a configuration for a virtual search space. By utilizing the DCI or MAC-CE, any parameter associated with SPS communication (e.g., downlink or uplink) may be reconfigured.

Aspects of the present disclosure provide two techniques to modify the format of the reconfigured DCI/MAC-CE. In the first example, aspects of the present disclosure may reuse existing SPS Activation DCI format with minor modifications to signal to the UE that the base station has reconfigured one or more configuration parameters. Specifically, as discussed above, for SPS communication, the base station may allocate resources for the UE at once and let the UE use these resources for subsequent periodic traffic instead of allocating the resources more periodically. In other words, the base station may assign a predefined amount of resources to a UE with a certain periodicity. Therefore, the UE is not required to request resources during each TTI, thus saving control plan overhead at the base station. Thus, a base station may provide initial configuration information identifying an SPS configuration, and the UE may transmit or receive a communication in accordance with the SPS configuration. When scheduled semi-persistently, the UE may need to monitor a physical downlink control channel in every subframe since the eNB may activate/re-activate/release SPS at any time using downlink control information DCI.

As such, in the first example, aspects of the present disclosure leverage this existing Activation DCI message format to further signal reconfiguration of one or more reconfigured parameters associated with SPS communication (e.g., beam indication, MCS, rank, precoding matrix index, allocated time/frequency resource, period, offset, etc.). For instance, the existing Activation DCI message includes invalid values that are unassigned. For example, the hybrid automatic repeat request (HARD) process number with all "1s" is currently unused and may be utilized to signal a reconfigured parameter for SPS. In other examples, the DCI may indicate BWP switching, but with corresponding time domain resource allocation that is less than the UE required BWP switching latency. In additional example, the DCI may indicate beam switching, but with corresponding time domain resource allocation less than UE required beam switching latency. It should be appreciated that each of the above examples may be used individually or jointly with any combination. In some examples, a new RNTI scrambling the CRC of the reconfiguration DCI can be used.

As such, values associated with the remaining fields in the reconfiguration DCI may be either the same as those in the activation DCI (e.g., values different from previous reconfiguration/activation DCI are those parameters to be updated) or at least some of the values can be redefined. Thus, the differentiator between the existing value definition and the new value definition may indicate different definitions. For example, the HARQ process number 0001 may indicate that remaining fields carry the updated PDSCH TCI state, and the HARQ process number 0010 may indicate that remaining fields carry the updated PDSCH MCS.

In a second example, an aspect of the present disclosure may introduce a new DCI format or new MAC-CE for SPS/CG reconfiguration. In such instance, the fields of the new format may have either fixed definitions where each field may carry one reconfigured parameter value which may or may not be the same as previous operating value, or at least part of the fields may have dynamic definitions. An indicator associated with the new DCI/MAC-CE format may signal which updated parameter values are carried and allow the UE to be configured according for SPS communication.

At block 210, the UE may determine whether the received DCI or MAC-CE is an activation DCI or a reconfiguration DCI based at least in part on the format of the DCI. At block 215, the UE may configure the UE for downlink SPS communication based at least in part on the determination. At block 220, the base station 102 may transmit an SPS traffic based on reconfigured parameters indicated in the prior DCI or MAC-CE.

Figure 3:
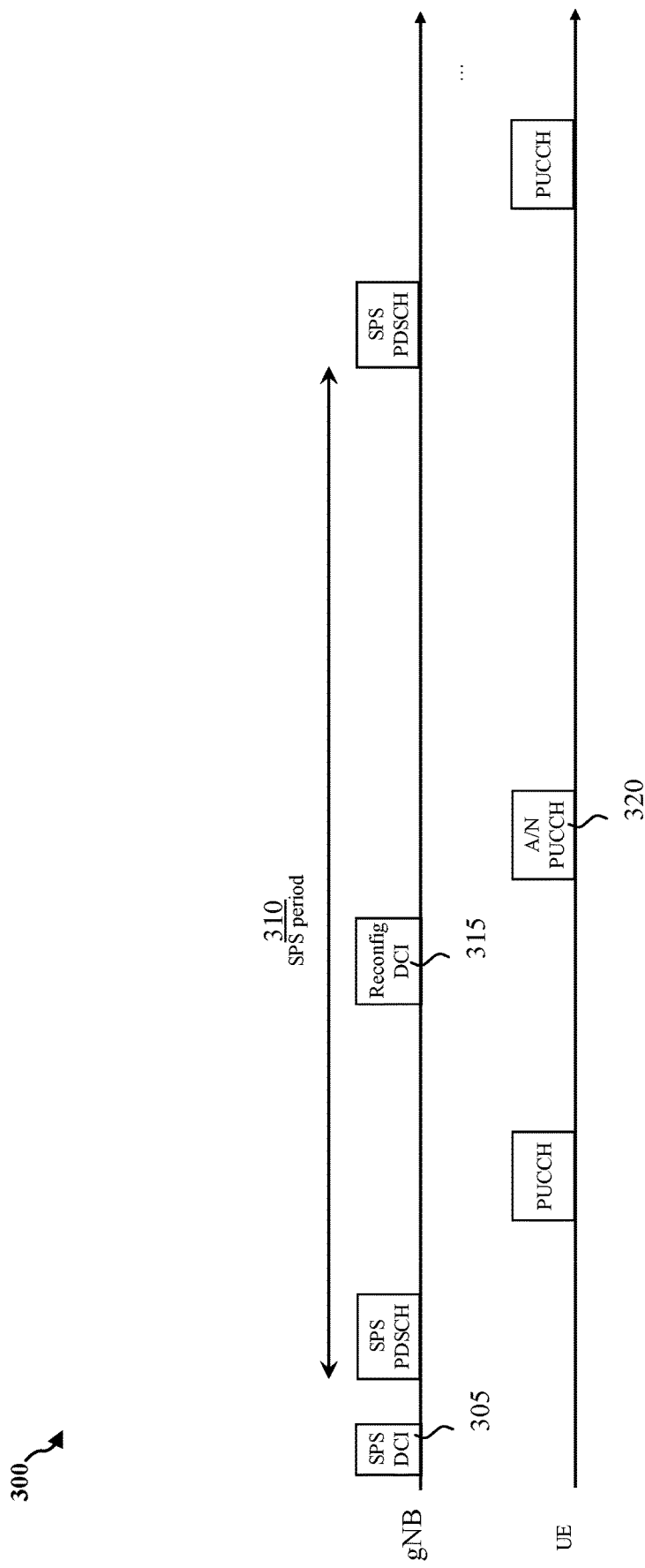
FIG. 3 is a timing diagram of a reconfiguration DCI being transmitted during an SPS period and the reconfigured parameters being activated in accordance with various aspects of the present disclosure.

FIG. 3 is a timing diagram 300 of a reconfigured DCI 315 being transmitted during an SPS period 310 and the reconfigured parameters being activated in accordance with various aspects of the present disclosure. Specifically, in some aspects the base station may schedule the UE for SPS communication based on an initial SPS DCI 305 that may activate SPS communication. However, in some instances, during the SPS period 310, the base station may determine to transmit a reconfigured DCI 315 message to the UE. In such instance, the A/N rule may be utilized for SPS deactivation DCI.

For example, the UE, upon receiving the reconfigured DCI 315, may transmit A/N 320 on PUCCH that indicates parameters that are already activated (e.g., reconfigured TCI state is already activated by MAC-CE). In such instance, the reconfigured SPS parameters may be activated at the end of the A/N 320 for subsequent SPS communication. However, if the A/N does not indicate any parameters that are already activated, the base station and the UE may wait a predetermined time period from the end of the A/N 320 (e.g., 3 ms) prior to activating the reconfigured parameters for subsequent SPS communication.

Figure 4:
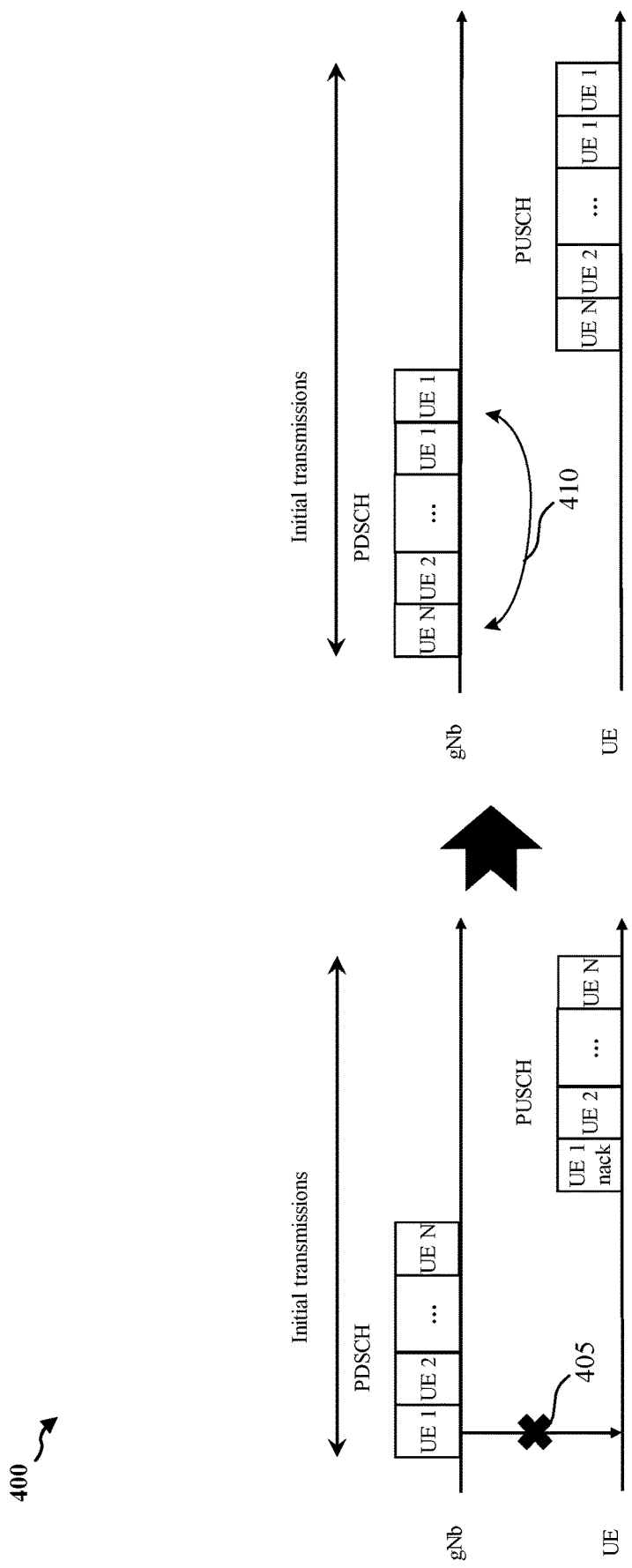
FIG. 4 is a conceptual diagram of reconfigurable parameters for SPS/CG that allow the base station and the UE to coordinate resource repetition and location offset in each transmission period.

FIG. 4 is a conceptual diagram 400 of reconfigurable parameters for SPS/CG that allow the base station and the UE to coordinate resource repetition and location offset in each transmission period. For example, in the first instance, if during the initial transmission period the first UE is unable to receive the downlink PDSCH 405, aspects of the present disclosure allow reconfiguration of the SPS parameters on a per cycle basis such that for subsequent SPS period, the resources allocated by the base station for the UE may be offset and provided repetition, when necessary without unduly adjusting the allocation of all resources. For instance, with respect to the illustrated example, the reconfiguration for the SPS may allow "UE N" and the first UE ("UE1") to switch positions 410 and the first UE may be provided resource repetition due to unsuccessful initial transmission. It would be appreciated that the repetition may be across different beams for improved robustness. However, such reconfiguration would not impact the resource allocation for the remaining UEs and thus would minimize disruption on the network.

Figure 5:
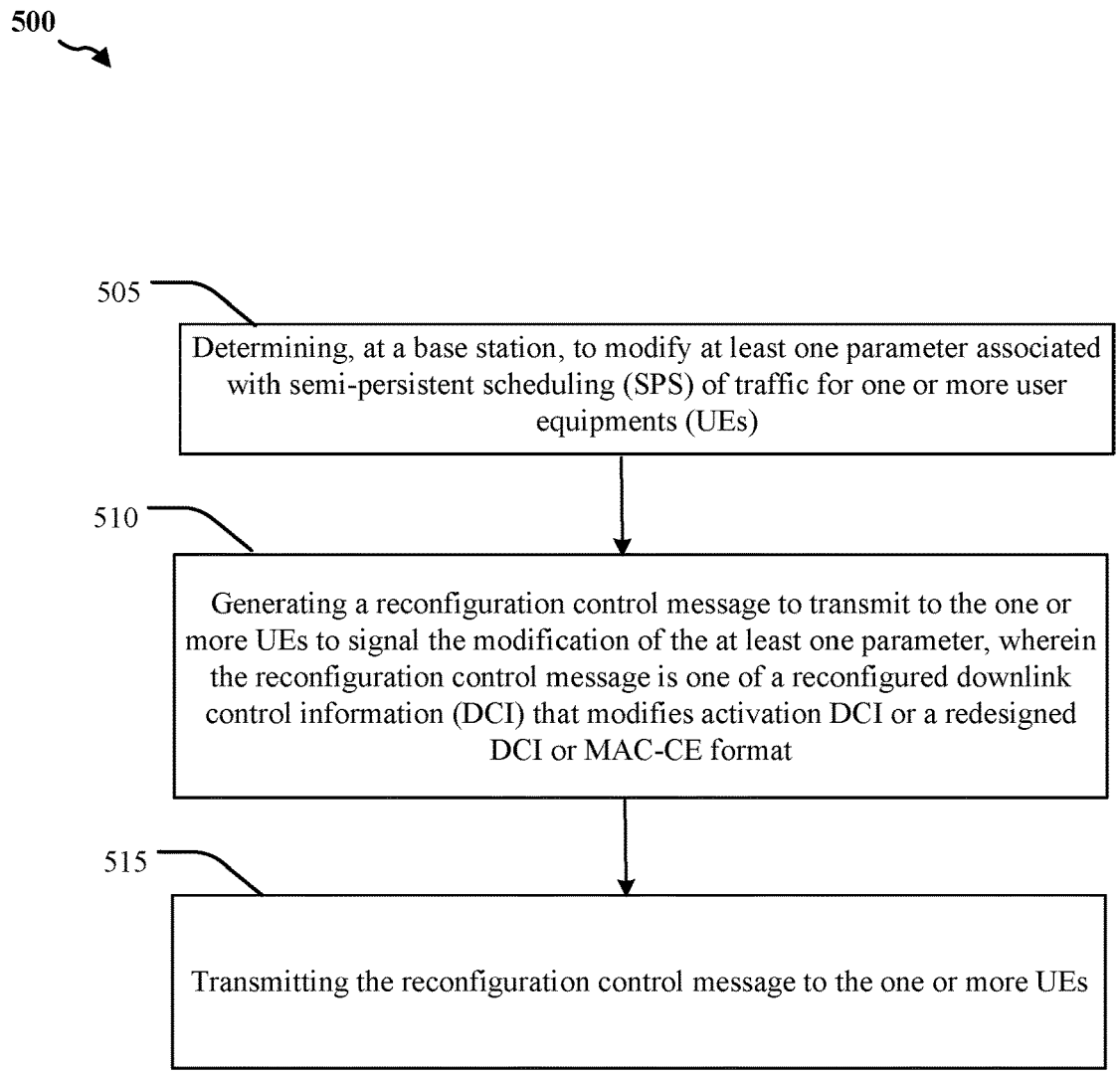
FIG. 5 is a flowchart of an example method of wireless communication performed by the base station.

FIG. 5 is a flowchart of an example method 500 of wireless communication. The method 500 may be performed by the base station 102 and/or components thereof.

At block 505, the method 500 may determining, at a base station, to modify at least one parameter associated with semi-persistent scheduling (SPS) of traffic for one or more user equipments (UEs). In some examples, the at least one parameter that is modified may include one or more of resource repetition or location offset in each transmission period. In other examples, the at least one parameter may include one or more of beam indication, modulation and coding schemes (MCS), rank, precoding matrix index, allocated time/frequency resource, period, location offset, resource repetition or location offset. Aspects of block 510 may be performed by SPS management component 640 described with reference to FIG. 7.

At block 510, the method 500 may include generating a reconfiguration control message to transmit to the one or more UEs to signal the modification of the at least one parameter, wherein the reconfiguration control message is one of a reconfigured downlink control information (DCI) that modifies activation DCI or a redesigned DCI or MAC-CE format. In some examples, the reconfigured DCI that modifies activation DCI utilizes invalid values that are not allocated by the activation DCI to signal that the base station has modified the at least one parameter associated with the SPS. In other examples, the redesigned DCI or MAC-CE format includes fields that have either fixed or dynamic definitions such that each field would carry at least one reconfiguration parameter value. Aspects of block 510 may be performed by SPS management component 640 described with reference to FIG. 7.

At block 515, the method 500 may include transmitting the reconfiguration control message to the one or more UEs. Aspects of block 515 may be performed by transceiver 702 described with reference to FIG. 7.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

Figure 6:
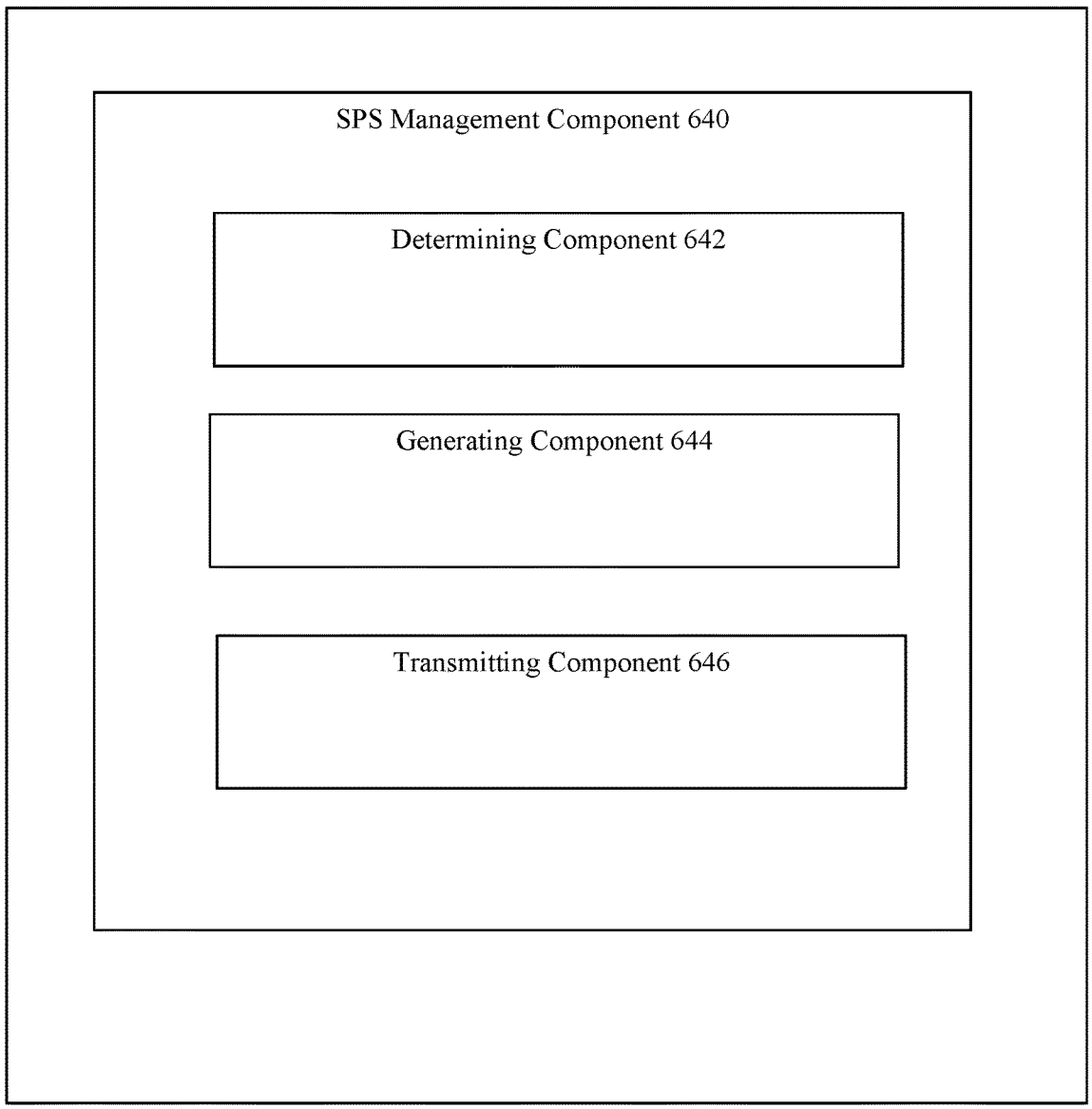
FIG. 6 is block diagram illustrating an SPS management component of a base station, in accordance with examples of the technology disclosed herein.

Aspects of the technology disclosed herein can be viewed as components providing means for performing the function of each particular component. For example, referring to FIG. 6, and continuing to refer to prior figures for context, the base station 102 may include a SPS Management Component 640. The SPS Management Component 640 may include a determining component 642, a generating component 644, and a transmitting component 646.

In some examples, the determining component 642 may be configured to, or may comprise means for, determining, at a base station, to modify at least one parameter associated with SPS of traffic for one or more UEs. The generating component 644 may be configured to, or may comprise means for, generating a reconfiguration control message to transmit to the one or more UEs to signal the modification of the at least one parameter, wherein the reconfiguration control message is one of a reconfigured downlink control information (DCI) that modifies an activation DCI or a redesigned format for DCI or MAC-CE. The transmitting component 646 may be configured to, or may comprise means for, transmitting the reconfiguration control message to the one or more UEs.

Figure 7:
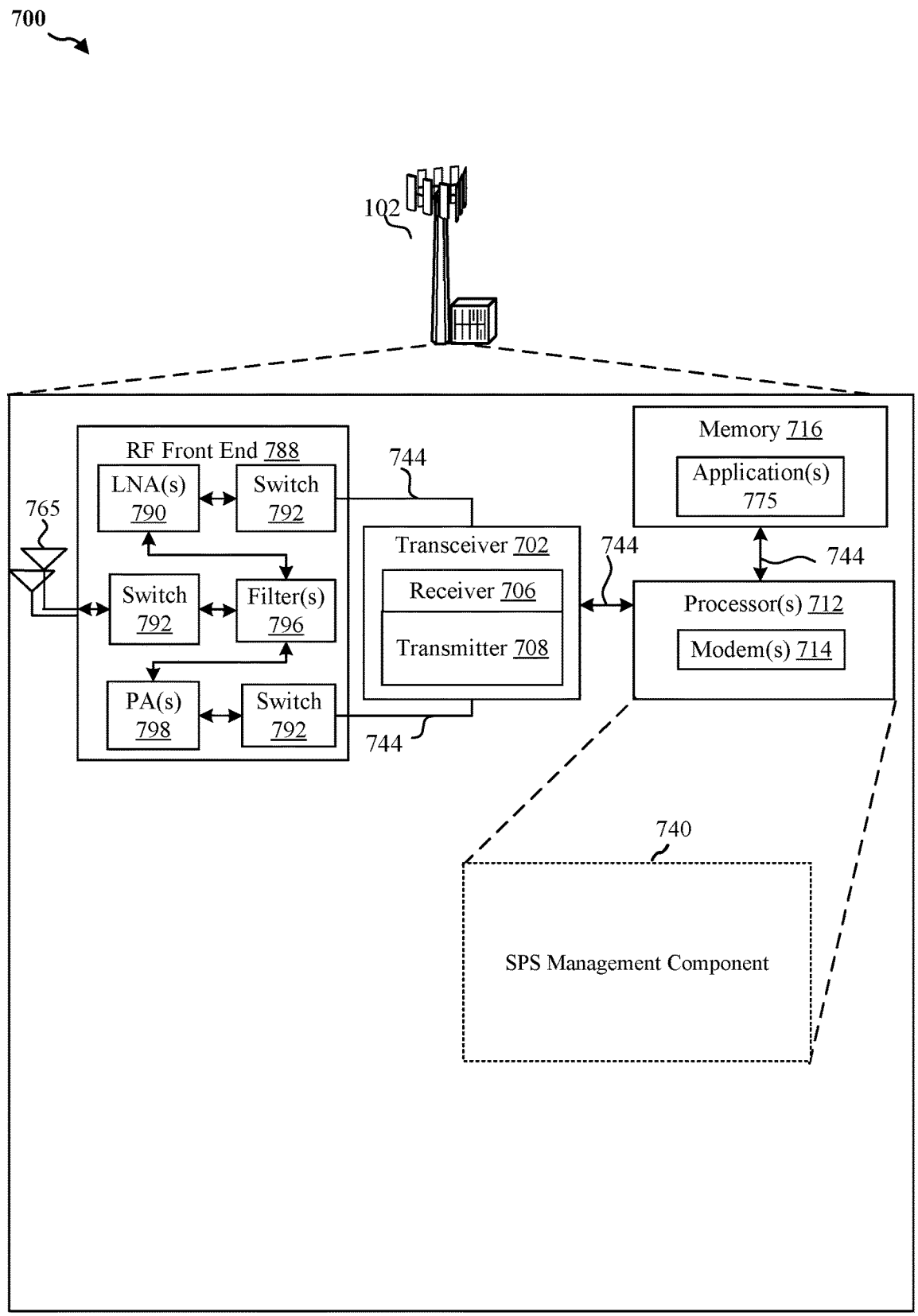
FIG. 7 is a schematic diagram of example components of the base station of FIG. 1.

Referring to FIG. 7, one example 700 of an implementation of base station 102 may include a variety of components, some of which have already been described above, but including components such as one or more processors 712 and memory 716 and transceiver 702 in communication via one or more buses 744, which may operate in conjunction with modem 714 and SPS management component 640 to enable one or more of the functions described herein related to selectively using dual connectivity. Further, the one or more processors 712, modem 714, memory 716, transceiver 702, RF front end 788 and one or more antennas 765 may be configured to support voice or data calls (simultaneously or non-simultaneously) in one or more radio access technologies.

In an aspect, the one or more processors 712 may include a modem 714 that uses one or more modem processors. The various functions related to SPS management component 640 may be included in modem 714 or processors 712 and, in an aspect, may be executed by a single processor, while in other aspects, different ones of the functions may be executed by a combination of two or more different processors. For example, in an aspect, the one or more processors 712 may include any one or any combination of a modem processor, or a baseband processor, or a digital signal processor, or a transmit processor, or a receiver processor, or a transceiver processor associated with transceiver 702. In other aspects, some of the features of the one or more processors 712 or modem 714 associated with SPS management component 640 may be performed by transceiver 702.

Also, memory 716 may be configured to store data used herein or local versions of applications 775, SPS management component 640 or one or more of subcomponents thereof being executed by at least one processor 712. Memory 716 may include any type of computer-readable medium usable by a computer or at least one processor 712, such as random access memory (RAM), read only memory (ROM), tapes, magnetic discs, optical discs, volatile memory, non-volatile memory, and any combination thereof. In an aspect, for example, memory 716 may be a non-transitory computer-readable storage medium that stores one or more computer-executable codes defining SPS management component 640 or one or more of subcomponents thereof, or data associated therewith, when base station 102 is operating at least one processor 712 to execute SPS management component 640 or one or more subcomponents thereof.

Transceiver 702 may include at least one receiver 706 and at least one transmitter 708. Receiver 706 may include hardware, firmware, or software code executable by a processor for receiving data, the code including instructions and being stored in a memory (such as a computer-readable medium). Receiver 706 may be, for example, a radio frequency (RF) receiver. In an aspect, receiver 706 may receive signals transmitted by at least one base station 102. Additionally, receiver 706 may process such received signals, and also may obtain measurements of the signals, such as, but not limited to, Energy per chip to Interference power ratio (Ec/Io), SNR, reference signal received power (RSRP), received signal strength indicator (RSSI), etc. Transmitter 708 may include hardware, firmware, or software code executable by a processor for transmitting data, the code including instructions and being stored in a memory (such as computer-readable medium). A suitable example of transmitter 708 may including, but is not limited to, an RF transmitter.

Moreover, in an aspect, base station 102 may include RF front end 788, which may operate in communication with one or more antennas 765 and transceiver 702 for receiving and transmitting radio transmissions, for example, wireless communication transmitted by at least one base station 102 or wireless transmissions transmitted by base station 102.

RF front end 788 may be connected to one or more antennas 765 and may include one or more low-noise amplifiers (LNAs) 790, one or more switches 792, one or more power amplifiers (PAs) 798, and one or more filters 796 for transmitting and receiving RF signals.

In an aspect, LNA 790 may amplify a received signal at a desired output level. In an aspect, each LNA 790 may have a specified minimum and maximum gain values. In an aspect, RF front end 788 may use one or more switches 792 to select a particular LNA 790 and its specified gain value based on a desired gain value for a particular application.

Further, for example, one or more PA(s) 798 may be used by RF front end 788 to amplify a signal for an RF output at a desired output power level. In an aspect, each PA 798 may have specified minimum and maximum gain values. In an aspect, RF front end 788 may use one or more switches 792 to select a particular PA 798 and its specified gain value based on a desired gain value for a particular application.

Also, for example, one or more filters 796 may be used by RF front end 788 to filter a received signal to obtain an input RF signal. Similarly, in an aspect, for example, a respective filter 796 may be used to filter an output from a respective PA 798 to produce an output signal for transmission. In an aspect, each filter 796 may be connected to a specific LNA 790 or PA 798. In an aspect, RF front end 788 may use one or more switches 792 to select a transmit or receive path using a specified filter 796, LNA 790, or PA 798, based on a configuration as specified by transceiver 702 or processor 712.

As such, transceiver 702 may be configured to transmit and receive wireless signals through one or more antennas 765 via RF front end 788. In an aspect, transceiver 702 may be tuned to operate at specified frequencies such that base station 102 can communicate with, for example, one or more UEs 104 or one or more cells associated with one or more UEs 104. In an aspect, for example, modem 714 may configure transceiver 702 to operate at a specified frequency and power level based on the base station configuration of the base station 102 and the communication protocol used by modem 714.

In an aspect, modem 714 may be a multiband-multimode modem, which can process digital data and communicate with transceiver 702 such that the digital data is sent and received using transceiver 702. In an aspect, modem 714 may be multiband and be configured to support multiple frequency bands for a specific communication protocol. In an aspect, modem 714 may be multimode and be configured to support multiple operating networks and communication protocols. In an aspect, modem 714 may control one or more components of UE 104 (such as RF front end 788, transceiver 702) to enable transmission or reception of signals from the network based on a specified modem configuration. In an aspect, the modem configuration may be based on the mode of the modem and the frequency band in use. In another aspect, the modem configuration may be based on UE configuration information associated with UE 104 as provided by the network during cell selection or cell reselection.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Figure 8:
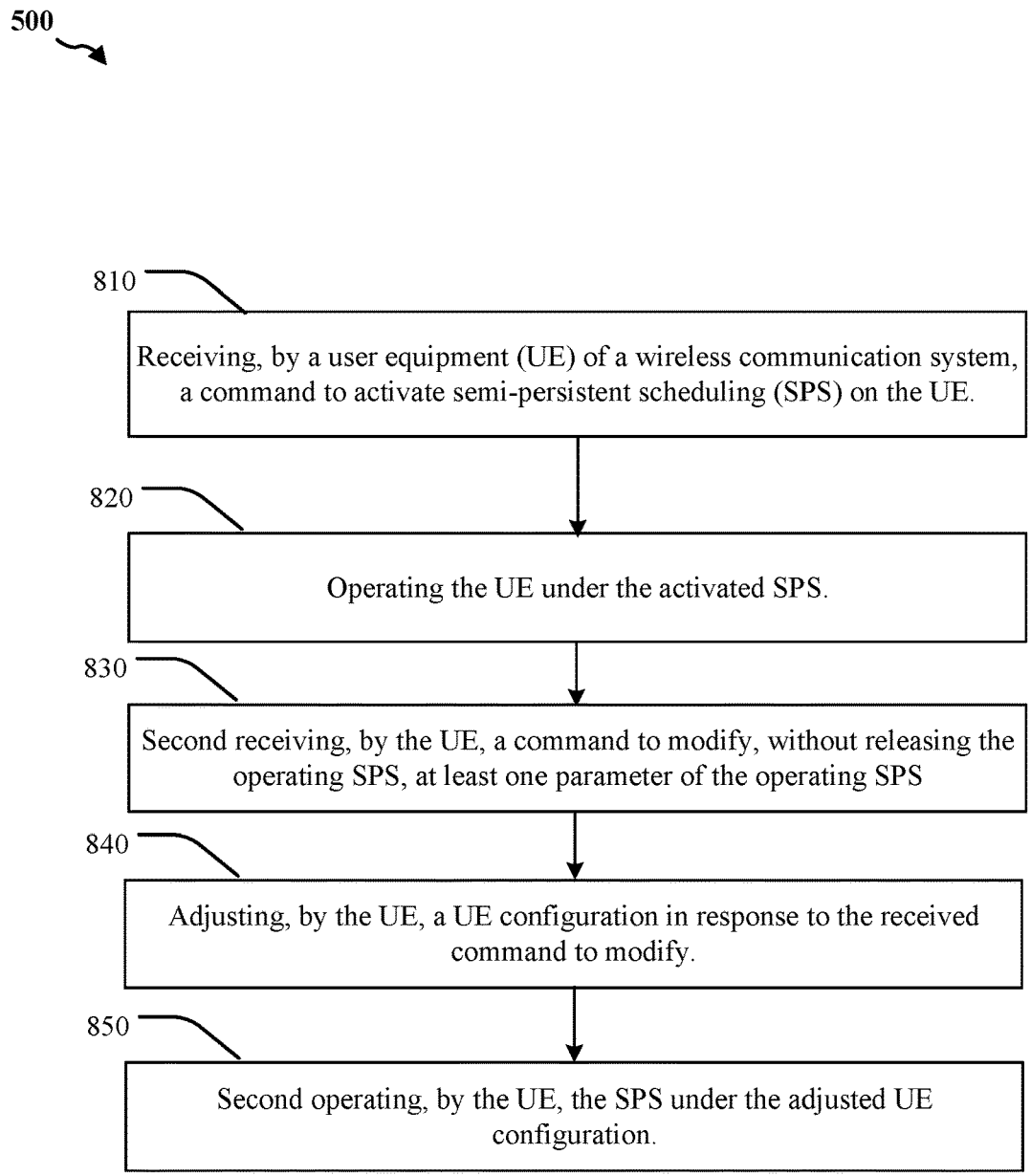
FIG. 8 is a flowchart of an example method of wireless communication performed by a UE.

Referring to FIG. 8, and continuing to refer to prior figures for context, methods for wireless communication are illustrated, in accordance with examples of the technology disclosed herein. In such methods a UE receives a command to activate semi-persistent scheduling (SPS) on the UE—Block 810. For example, UE 104 had previously received an SPS configuration command from base station 102 at the time of dedicated bearer establishment for a VoIP service under an SPS Radio Network Temporary Identifier (RNTI). Use of a configured SPS requires activation. This configuration causes the UE to monitor PDCCH with CRC scrambled by the SPS RNTI for activation, re-activation, or release of the SPS via DCI.

The UE operates under the activated SPS—Block 820. Continuing with the present example, the UE continues to monitor PDCCH with CRC scrambled by the SPS RNTI for activation, re-activation, or release of the SPS via DCI. However, the UE receives no new activation or a reactivation or a release of the SPS.

The UE second receives a command to modify, without releasing or re-activating the operating SPS, at least one parameter of the operating SPS—Block 830. In the continuing example, the command to modify is included in a reconfigured DCI that modifies an activation DCI and modifies a beam indication of the UE. The reconfigured DCI utilizes previously invalid values that are not allocated by the activation DCI, thus signaling that the base station has modified the at least one parameter associated with the operating SPS.

The UE adjusts UE configuration in response to the received command to modify—Block 840. In the continuing example, the UE adjusts the beam indication in accordance with the received command to modify. The UE second operates under the activated the SPS using the adjusted UE configuration—Block 850. In the continuing example, the UE uses the adjusted beam indication for receiving subsequent transmissions from the base station for the SPS RNTI.

Figure 9:
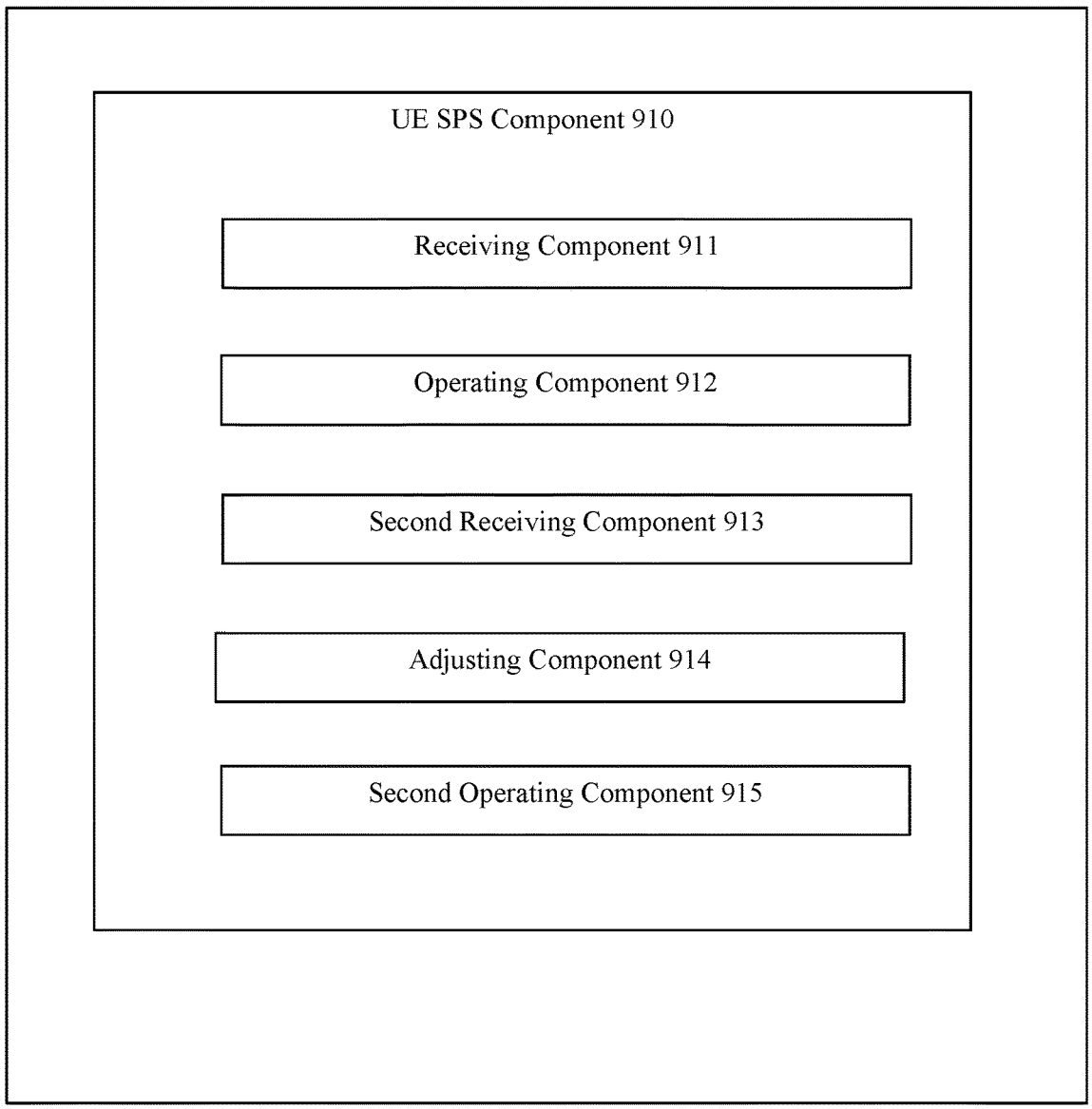
FIG. 9 is a block diagram illustrating a UE SPS component of a UE, in accordance with examples of the technology disclosed herein.

Aspects of the technology disclosed herein can be viewed as components providing means for performing the function of each particular component. For example, referring to FIG. 9, and continuing to refer to prior figures for context, the UE 104 may include a UE SPS Component 910. The UE SPS Component 910 may include a receiving component 911, an operating component 912, a second receiving component 913, and adjusting component 914, and a second operating component 915.

In some examples, the receiving component 911 may be configured to, or may comprise means for, receiving a command to activate SPS on the UE. The operating component 912 may be configured to, or may comprise means for, operating the UE under the current SPS in the absence of a new activation, re-activation. The second receiving component 913 may be configured to, or may comprise means for, second receiving a command to modify, without releasing the operating SPS, at least one parameter of the operating SPS. The adjusting component 914 may be configured to, or may comprise means for, adjusting the UE configuration in response to the received command to modify. The second operating component 915 may be configured to, or may comprise means for, second operating under the activated SPS using the adjusted UE configuration.

Figure 10:
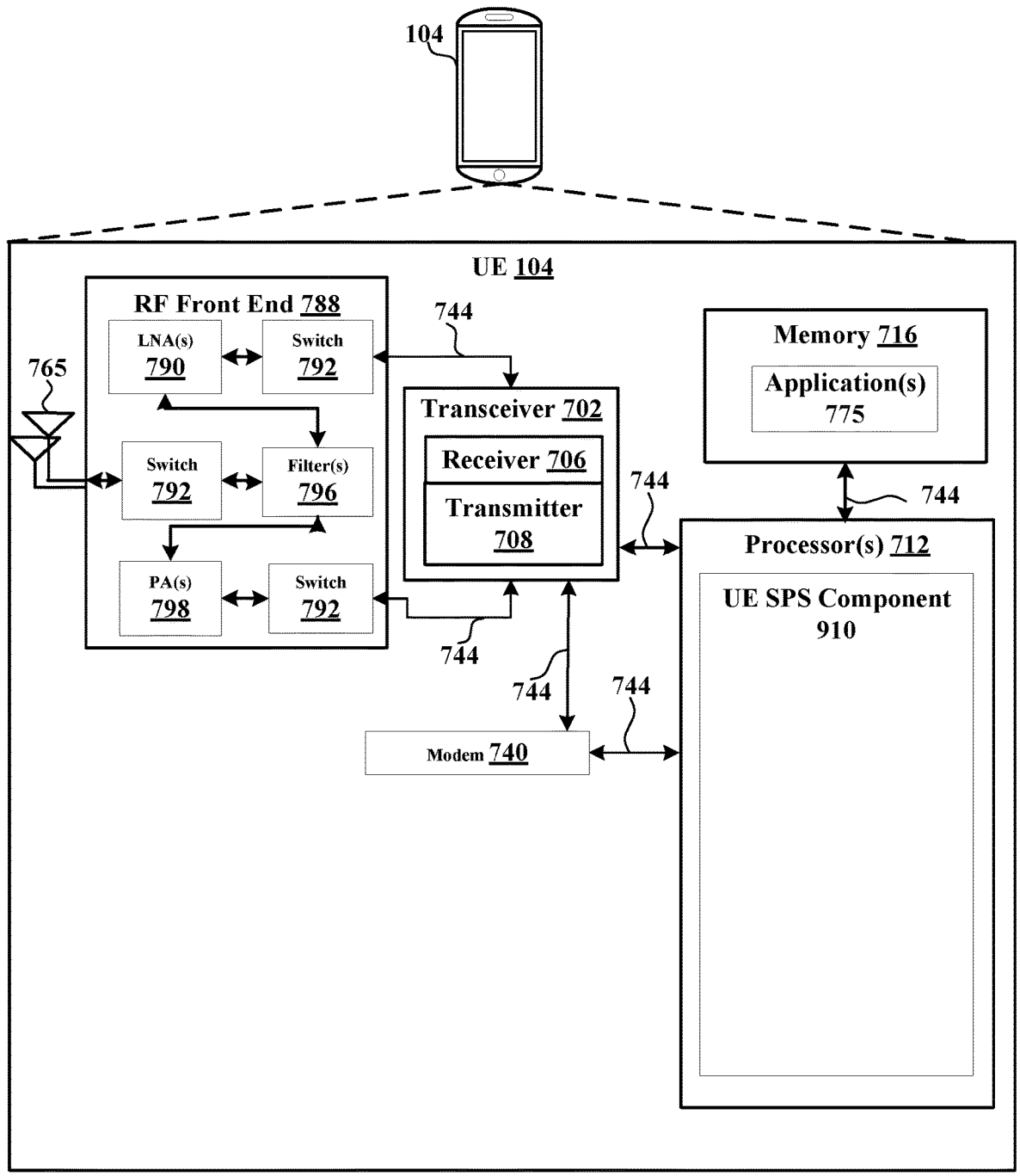
FIG. 10 is a schematic diagram of example components of the UE of FIG. 1.

Referring to FIG. 10, one example of an implementation of UE 104 may include a variety of components, some of which have already been described above in conjunction with the role of each component in the base station 102, including components such as one or more processors 712 and memory 716 and transceiver 702 in communication via one or more buses 744, which may operate in conjunction with modem 740 and/or US SPS component 910 for communicating, as described further herein. Each performs a similar role in UE 104.

In an aspect, the one or more processors 712 can include a modem 740 and/or can be part of the modem 740 that uses one or more modem processors. Thus, the various functions related to UE SPS component 910 may be included in modem 740 and/or processors 712 and, in an aspect, can be executed by a single processor, while in other aspects, different ones of the functions may be executed by a combination of two or more different processors. For example, in an aspect, the one or more processors 712 may include any one or any combination of a modem processor, or a baseband processor, or a digital signal processor, or a transmit processor, or a receiver processor, or a transceiver processor associated with transceiver 702. In other aspects, some of the features of the one or more processors 712 and/or modem 740 associated with UE SPS component 910 may be performed by transceiver 702.

Also, memory 716 may be configured to store data used herein and/or local versions of applications 775 or UE SPS component 910 and/or one or more of its subcomponents being executed by at least one processor 712. Memory 716 can include any type of computer-readable medium usable by a computer or at least one processor 712, such as random access memory (RAM), read only memory (ROM), tapes, magnetic discs, optical discs, volatile memory, non-volatile memory, and any combination thereof. In an aspect, for example, memory 716 may be a non-transitory computer-readable storage medium that stores one or more computer-executable codes defining US SPS component 910 and/or one or more of its subcomponents, and/or data associated therewith, when UE 104 is operating at least one processor 712 to execute UE SPS component 910 and/or one or more of its subcomponents.

Some Further Example Implementations

An example method of wireless communication for a base station comprising: determining, at a base station, to modify at least one parameter associated with semi-persistent scheduling (SPS) of traffic for one or more user equipments (UEs); generating a reconfiguration control message to transmit to the one or more UEs to signal the modification of the at least one parameter, wherein the reconfiguration control message is one of a reconfigured downlink control information (DCI) that modifies activation DCI or a redesigned DCI or MAC-CE format; and transmitting the reconfiguration control message to the one or more UEs.

The above example method, wherein the reconfigured DCI that modifies activation DCI utilizes invalid values that are not allocated by the activation DCI in order to signal that the base station has modified the at least one parameter associated with the SPS.

Any of the above example methods, wherein the redesigned DCI or MAC-CE format includes fields that have either fixed or dynamic definitions such that each field would carry at least one reconfiguration parameter value.

Any of the above example methods, wherein the at least one parameter that is modified includes one or more of resource repetition or location offset in each transmission period.

Any of the above example methods, wherein the at least one parameter includes one or more of beam indication, modulation and coding schemes (MCS), rank, precoding matrix index, allocated time/frequency resource, period, location offset, resource repetition or location offset.

An example apparatus of wireless communication for a base station comprising: a memory storing computer-executable instructions and at least one processor coupled with the memory and configured to: determine, at a base station, to modify at least one parameter associated with semi-persistent scheduling (SPS) of traffic for one or more user equipments (UEs); generate a reconfiguration control message to transmit to the one or more UEs to signal the modification of the at least one parameter, wherein the reconfiguration control message is one of a reconfigured downlink control information (DCI) that modifies activation DCI or a redesigned DCI or MAC-CE format; and transmit the reconfiguration control message to the one or more UEs.

The above example apparatus, wherein the reconfigured DCI that modifies activation DCI utilizes invalid values that are not allocated by the activation DCI to signal that the base station has modified the at least one parameter associated with the SPS.

Any of the above example apparatus, wherein the redesigned DCI or MAC-CE format includes fields that have either fixed or dynamic definitions such that each field would carry at least one reconfiguration parameter value.

Any of the above example apparatus, wherein the at least one parameter that is modified includes one or more of resource repetition or location offset in each transmission period.

Any of the above example apparatus, wherein the at least one parameter includes one or more of beam indication, modulation and coding schemes (MCS), rank, precoding matrix index, allocated time/frequency resource, period, location offset, resource repetition or location offset.

An example computer readable medium of wireless communication for a base station comprising: determining, at a base station, to modify at least one parameter associated with semi-persistent scheduling (SPS) of traffic for one or more user equipments (UEs); generating a reconfiguration control message to transmit to the one or more UEs to signal the modification of the at least one parameter, wherein the reconfiguration control message is one of a reconfigured downlink control information (DCI) that modifies activation DCI or a redesigned DCI or MAC-CE format; and transmitting the reconfiguration control message to the one or more UEs.

The above example computer readable medium, wherein the reconfigured DCI that modifies activation DCI utilizes invalid values that are not allocated by the activation DCI to signal that the base station has modified the at least one parameter associated with the SPS.

Any of the above example computer readable medium, wherein the redesigned DCI or MAC-CE format includes fields that have either fixed or dynamic definitions such that each field would carry at least one reconfiguration parameter value.

Any of the above example computer readable medium, wherein the at least one parameter that is modified includes one or more of resource repetition or location offset in each transmission period.

Any of the above example computer readable medium, wherein the at least one parameter includes one or more of beam indication, modulation and coding schemes (MCS), rank, precoding matrix index, allocated time/frequency resource, period, location offset, resource repetition or location offset.

An example method of wireless communication for a UE includes receiving, by a user equipment (UE) of a wireless communication system, a command to activate semi-persistent scheduling (SPS) on the UE; operating, by the UE, under the activated SPS; second receiving, by the UE, a command to modify, without releasing the SPS, at least one parameter of the operating SPS; adjusting, by the UE, UE configuration in response to the received command to modify; and second operating, by the UE, under the adjusted UE configuration.

Another example includes the above example method of wireless communication for a UE wherein the command to modify is included in one of a reconfigured downlink control information (DCI) that modifies an activation DCI or a redesigned format for DCI or MAC-CE. Another example includes any of the above example methods of wireless communication for a UE wherein the reconfigured DCI that modifies the activation DCI utilizes invalid values that are not allocated by the activation DCI in order to signal that the base station has modified the at least one parameter of the operating SPS. Another example includes any of the above example methods of wireless communication for a UE wherein the redesigned DCI or MAC-CE format includes fields that have either fixed or dynamic definitions such that each field would carry at least one reconfiguration parameter value.

Another example includes any of the above example methods of wireless communication for a UE wherein the at least one parameter includes one or more of resource repetition or location offset in each transmission period.

Another example includes any of the above example methods of wireless communication for a UE wherein the at least one parameter includes one or more of beam indication, modulation and coding schemes (MCS), rank, precoding matrix index, allocated time/frequency resource, period, location offset, resource repetition or location offset.

An example apparatus of wireless communication, for example, a UE, includes a memory storing computer-executable instructions; and at least one processor coupled with the memory. The processor is configured to receive a command to activate semi-persistent scheduling (SPS) on the UE; operate under the activated SPS; second receive a command to modify, without releasing, at least one parameter of the operating SPS; adjust a configuration of the apparatus in response to the received command to modify; and second operate under the adjusted apparatus configuration.

Another example includes the above example apparatus of wireless communication for a UE wherein the command to modify is included in one of a reconfigured downlink control information (DCI) that modifies an activation DCI or a redesigned format for DCI or MAC-CE. Another example includes any of the above example apparatuses of wireless communication for a UE wherein the reconfigured DCI that modifies the activation DCI utilizes invalid values that are not allocated by the activation DCI in order to signal that the base station has modified the at least one parameter of the operating SPS. Another example includes any of the above example apparatuses of wireless communication for a UE wherein the redesigned DCI or MAC-CE format includes fields that have either fixed or dynamic definitions such that each field would carry at least one reconfiguration parameter value. Another example includes any of the above example apparatuses of wireless communication for a UE wherein the at least one parameter includes one or more of resource repetition or location offset in each transmission period. Another example includes any of the above example apparatuses of wireless communication for a UE wherein the at least one parameter includes one or more of beam indication, modulation and coding schemes (MCS), rank, precoding matrix index, allocated time/frequency resource, period, location offset, resource repetition or location offset.

What is claimed is:

1. A method of wireless communication, comprising:
   determining, at a base station, to modify at least one parameter associated with semi-persistent scheduling (SPS) of traffic for one or more user equipments (UEs);
   generating a reconfiguration control message to transmit to the one or more UEs to signal the modification of the at least one parameter, wherein the reconfiguration control message is one of a reconfigured DCI that modifies an activation DCI utilizing invalid values that are not allocated by the activation DCI in order to signal that the base station has modified the at least one parameter associated with the SPS; and
   transmitting the reconfiguration control message to the one or more UEs.

2. The method of claim 1, wherein the DCI includes fields that have either fixed or dynamic definitions such that each field would carry at least one reconfiguration parameter value.

3. The method of claim 1, wherein the at least one parameter that is modified includes one or more of resource repetition or location offset in each transmission period.

4. The method of claim 1, wherein the at least one parameter includes one or more of beam indication, modulation and coding schemes (MCS), rank, precoding matrix index, allocated time/frequency resource, period, location offset, resource repetition or location offset.

5. An apparatus for wireless communication, comprising:
   a memory storing computer-executable instructions; and
   at least one processor coupled with the memory and configured to:
      determine, at a base station, to modify at least one parameter associated with semi-persistent scheduling (SPS) of traffic for one or more user equipments (UEs);

generate a reconfiguration control message to transmit to the one or more UEs to signal the modification of the at least one parameter, wherein the reconfiguration control message is a reconfigured DCI that modifies an activation DCI utilizing invalid values that are not allocated by the activation DCI in order to signal that the base station has modified the at least one parameter associated with the SPS; and transmit the reconfiguration control message to the one or more UEs.

6. The apparatus of claim 5, wherein the at least one parameter that is modified includes one or more of resource repetition or location offset in each transmission period.

7. The apparatus of claim 5, wherein the at least one parameter includes one or more of beam indication, modulation and coding schemes (MCS), rank, precoding matrix index, allocated time/frequency resource, period, location offset, resource repetition or location offset.

8. A method of wireless communication, comprising:

receiving, by a user equipment (UE) of a wireless communication system, a command to activate semi-persistent scheduling (SPS) on the UE, wherein the command to activate is included in a reconfigured DCI that modifies an activation DCI utilizing invalid values that are not allocated by the activation DCI in order to signal that a base station has modified at least one parameter associated with the SPS;

operating, by the UE, under the activated SPS;

second receiving, by the UE, a command to modify, without releasing the operating SPS, at least one parameter of the operating SPS;

adjusting, by the UE, UE configuration in response to the received command to modify; and second operating, by the UE, under the activated SPS using the adjusted UE configuration.

9. The method of claim 8, wherein the DCI format includes fields that have either fixed or dynamic definitions such that each field would carry at least one reconfiguration parameter value.

10. The method of claim 8, wherein the at least one parameter includes one or more of resource repetition or location offset in each transmission period.

11. The method of claim 8, wherein the at least one parameter includes one or more of beam indication, modulation and coding schemes (MCS), rank, precoding matrix index, allocated time/frequency resource, period, location offset, resource repetition or location offset.

12. An apparatus for wireless communication, comprising:

a memory storing computer-executable instructions; and at least one processor coupled with the memory and configured to:

receive a command to activate semi-persistent scheduling (SPS) on a UE wherein the command to activate is included in a reconfigured DCI that modifies an activation DCI utilizing invalid values that are not allocated by the activation DCI in order to signal that a base station has modified at least one parameter associated with the SPS;

operate under the activated SPS;

second receive a command to modify, without releasing the operating SPS, at least one parameter of the operating SPS;

adjust a configuration of the apparatus in response to the received command to modify; and second operate under the activated SPS using the adjusted apparatus configuration.

13. The apparatus of claim 12, wherein the DCI includes fields that have either fixed or dynamic definitions such that each field would carry at least one reconfiguration parameter value.

* * * * *